United States Patent [19]

Porter

[11] 4,211,621
[45] Jul. 8, 1980

[54] METHOD AND APPARATUS FOR PRODUCING HYDROGEN USING SOLAR ENERGY

[75] Inventor: George Porter, London, England

[73] Assignee: National Research Development Corporation, London, England

[21] Appl. No.: 914,241

[22] Filed: Jun. 9, 1978

[30] Foreign Application Priority Data

Jun. 10, 1977 [GB] United Kingdom ............... 24404/77

[51] Int. Cl.² .............................................. B01J 1/10
[52] U.S. Cl. ............................ 204/157.1 R; 250/527
[58] Field of Search .................. 204/157.1 R; 250/527

[56] References Cited
U.S. PATENT DOCUMENTS

| | | | |
|---|---|---|---|
| 3,554,887 | 1/1971 | Feehs | 250/527 |
| 4,045,315 | 8/1977 | Ryason | 204/157.1 R |

*Primary Examiner*—Howard S. Williams
*Attorney, Agent, or Firm*—Sughrue, Rothwell, Mion, Zinn and Macpeak

[57] ABSTRACT

Apparatus suitable for use as a solar energy collector, the apparatus comprising a closed loop through which, in use, an aqueous solution can be circulated and be impinged upon by incident sunlight; means for circulating the aqueous solution around the closed loop; an inlet for introducing reactants into the closed loop; at least one unit in which the aqueous solution can be subjected to a chemical reaction, the said unit being interposed in the closed loop in a manner such that the said solution can flow through the unit; and an outlet for withdrawing products from the closed loop. The use of such apparatus to perform the photochemical oxidation of water to give oxygen and a reduced electron acceptor which acts as a store of energy is also described.

26 Claims, 3 Drawing Figures

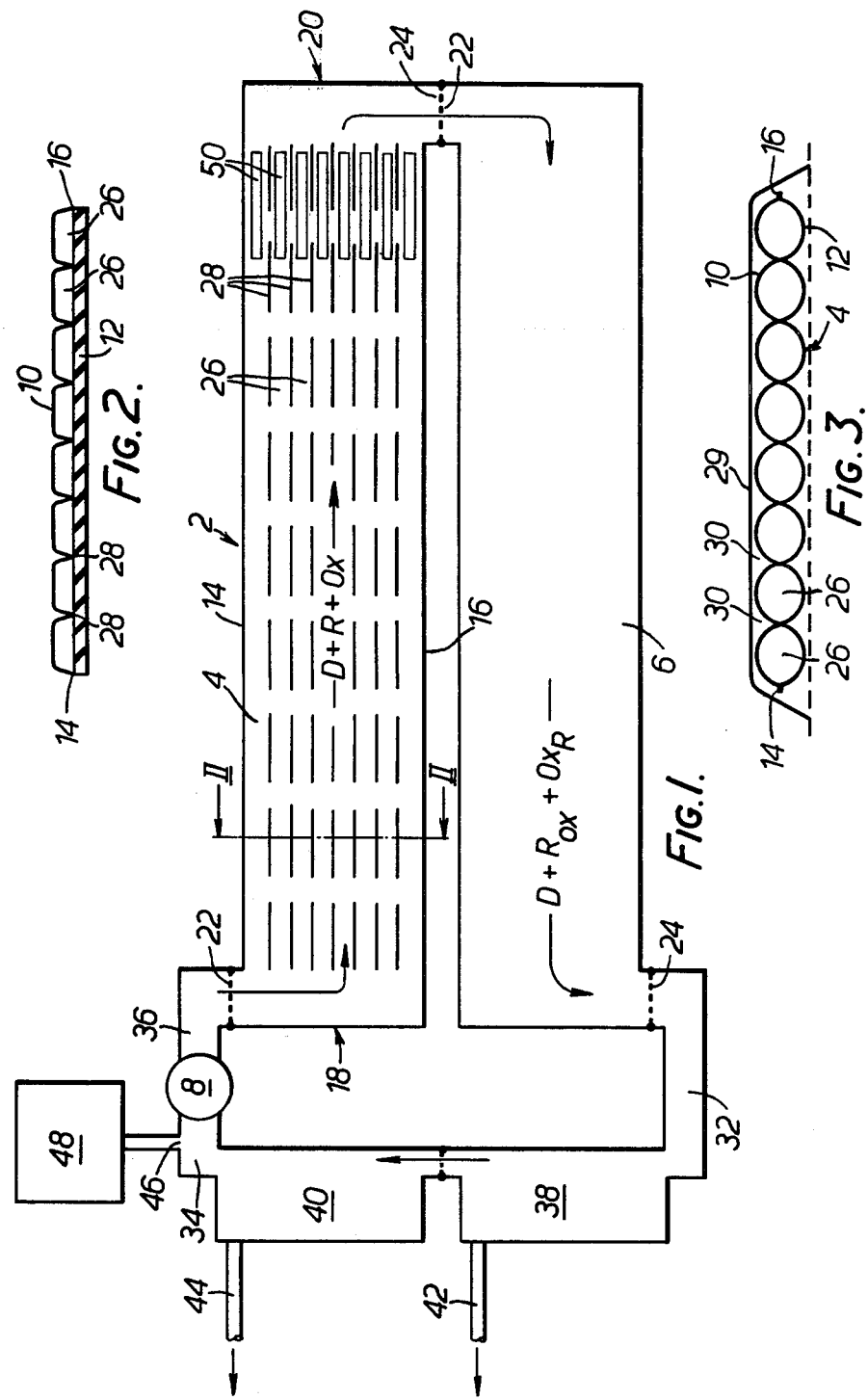

METHOD AND APPARATUS FOR PRODUCING HYDROGEN USING SOLAR ENERGY

BACKGROUND OF THE INVENTION

1. Field of the Invention

The present invention relates to an apparatus and a method for the collection of solar energy and for the conversion of the collected energy into chemical fuel.

2. Description of Prior Art

An economic system for the collection of solar energy requires a collector with a large surface area. Assuming an efficiency of collection of about 10%, the collector must cost less than 10 pounds sterling per square meter at present day (1977) prices if it is to collect energy (other than low grade heat energy) at a price competitive with that provided by a modern power station. Furthermore, the energy should preferably be produced in storable form.

No such collecting system is known today which costs less than 10 pounds sterling per square meter. Photovoltaic cells cost at least ten times this price and do not enable the energy to be stored. Block plates through which water is circulated are more economic but provide only low grade heat and only give short term storage.

BRIEF SUMMARY OF THE INVENTION

An object of the present invention is to provide an economically viable apparatus and method for the collection of solar energy.

According to one aspect of the present invention there is provided an apparatus suitable for use as solar energy collector, the apparatus comprising a closed loop through which, in use, an aqueous solution can be circulated and be impinged upon by incident sunlight; means for circulating the aqueous solution around the closed loop; an inlet for introducing reactants into the closed loop; at least one unit in which the aqueous solution can be subjected to a chemical reaction, the said unit being interposed in the closed loop in a manner such that the said solution can flow through the unit; and an outlet for withdrawing products from the closed loop.

The closed loop can be formed from any suitable material provided that the surface of the closed loop which faces the impinging sunlight is transparent to the sunlight. Naturally the larger the surface area of the closed loop upon which sunlight is incident, the greater will be the amount of solar energy collected by the system. Preferably the closed loop is made of a flexible material such as flexible plastics sheet so that it can be easily transported and assembled.

One convenient form of the closed loop is a plurality of prefabricated collection mats, preferably rectangular, each having an inlet port and an outlet port by means of which the mats can be connected one to another in sequence. Any number of the mats can be connected together to produce a total surface area of any required size. In this way many acres of desert, wasteland or roof surface can be covered conveniently and any one unit can be replaced easily should it be damaged.

The means for circulating the solution is preferably a pump which may conveniently be operated by solar energy, for example on the fluidyne principle, so that no external power is needed to operate the system.

The time for the solution to complete one cycle around the closed loop is typically half an hour, but depending on the concentration of the reactants in the solution and the intensity of the incident sunlight, it could be an order of magnitude smaller or greater than this. With a typical apparatus having a cyclic pathway 100 meters in overall length, a cycle time of half an hour would correspond to a flow rate of about 3 meters per minute.

According to a further aspect of the present invention there is provided a method for the collection of solar energy by photo-oxidation of water and for the conversion of such energy into a chemical fuel, which method comprises forming an aqueous solution of an absorbing substance D, a reducing substance R and an oxidising substance Ox, the substances D, R and Ox being chosen so that upon irradiation by sunlight dissociation and photo-oxidation of water takes place as a result of D absorbing light and the resultant excited state of D reacting with R, Ox and water to oxidise R to $R_{Ox}$ and reduce Ox to $Ox_R$; circulating the aqueous solution through the closed loop of an apparatus according to the invention while irradiating the solution with incident sunlight thereby to cause said photo-oxidation of water; at a first station in the closed loop, regenerating Ox from $Ox_R$ with liberation of hydrogen as the chemical fuel; optionally, at a second station in the closed loop, regenerating R from $R_{Ox}$ with concomitant release of oxygen; and introducing water into the closed loop to replace dissociated water.

The substances D, R and Ox are chosen so that in the overall reaction which takes place, D, R and Ox are not consumed and water is converted into hydrogen and oxygen.

The absorbing substance D which is a dye or a pigment may be permanently bound either to R or to Ox so as to improve the efficiency of the reaction. Furthermore one of the reactants, preferably that containing the substance D, may be bound to the surface of a solid carrier so that it is fixed in position and does not circulate with the aqueous solution.

In a preferred embodiment of the present method, D and R are bound together chemically. Preferably, the method of the present invention is performed by making use of the photochemical process for the catalytic photo-oxidation of water described in U.S. Ser. No. 895,555 filed Apr. 12, 1978. In this process D and R are bound together chemically and take the form of an organic complex of manganese while Ox takes the form of an electron acceptor such as quinone or certain specified heterocyclic compounds. More specific details of this preferred photochemical process are given below.

The chemical reactants such as D, R and Ox need not always be in solution. In an alternative arrangement there is included within the closed loop a solid carrier to the surface of which is fixed one or more chemical reactants. Preferably the solid carrier is constituted by strips of flexible material impregnated with the chemical reactant and anchored at one end to the closed loop, or by an inert material such as a zeolite impregnated with the chemical reactant.

It is a particular feature of the method of the present invention that it enables the oxidised material $R_{Ox}$ and the reduced material $Ox_R$ to be easily treated to regenerate R and Ox respectively. Furthermore, the present method enables the fuel to be released at a convenient location. This is especially an advantage when the fuel is hydrogen gas. In the arrangement of the present invention, the reduced material is produced in the aqueous solution during solar irradiation of the solution as the solution travels along the closed loop, but hydrogen is liberated from the reduced material at one or more chosen locations only in the closed loop. This is achieved by passing the irradiated aqueous solution through one or more units interposed in the loop, each of which is capable of converting $Ox_R$ into hydrogen gas or hydrogen in some convenient bound form with consequent regeneration of Ox. Hydrogen gas may pass immediately into a gas supply line, whilst a bound form of hydrogen may be transported in liquid or solid form for use elsewhere as a fuel.

In some systems, as the solution passes along the loop, oxygen is automatically released from the oxidised material and allowed to escape. In these cases the oxygen release unit or units are not necessary. In other systems, if the oxygen is required as a product or if it interferes with the rest of the chemical cycle, it may be released at one or more locations only in the loop by one or more catalytic oxygen release units in which the reducing substance is regenerated and oxygen is liberated.

BRIEF DESCRIPTION OF THE DRAWINGS

The apparatus and method of the present invention will now be described, by way of example only, with reference to the following drawings, in which:

FIG. 1 is a diagrammatic plan of one embodiment of the apparatus of the present invention;

FIG. 2 is a section along the line II—II of the apparatus shown in FIG. 1; and

FIG. 3 is a section of a mat similar to that shown in FIG. 2, but of different construction.

In the drawings, like reference numerals refer to like parts.

DETAILED DESCRIPTION OF THE PREFERRED EMBODIMENTS

Referring to FIGS. 1 and 2 there is shown a closed loop, indicated generally at 2, comprising two prefabricated collection mats 4, 6 connected in sequence. Although only two mats are shown, any desired number of mats may be connected together in sequence provided that the pump 8 has sufficient power to circulate a liquid solution around the closed loop formed by the interconnected mats. The mats shown in the drawings are made of an upper sheet 10 of flexible plastic material welded to a base 12 at each side 14, 16 and at each end 18, 20. Each mat has an inlet port 22 at one end and an outlet port 24 at the opposite end, for respective entry and exit of the solution which, in operation, passes through each mat. Suitable plastics materials for the upper sheet 10 are cellophane, polyethylene, poly-propylene, poly-phenyleneoxide, poly-amides, polyesters, or glass reinforced plastics, although any inexpensive transparent material which is resistant to sunlight would be suitable. The base 12 is also flexible and impermeable to water. A suitable material for the base 12 is rubber re-inforced bitumen of the type presently used in the desert to reduce the shifting of sand. The upper 10 is also welded to the base along spaced apart longitudinal lines 28 parallel to the sides of the sheets in order to form a series of longitudinal channels 26 which guide the flow of the solution through the mat. The height of each channel 26, when full of solution, is typically from 1 to 10 cm. When suitable materials, welding of the upper sheet 10 to the base 12 can be achieved merely by heating at the required sealing positions.

Preferably the surface of the base 12 which faces the incident sunlight is covered with white paint or another suitable white material to reflect the incident rays of sunlight back through the aqueous solution.

An alternative construction of mat is shown in FIG. 3 in which an upper sheet 10 of the type described in FIG. 2 is heat sealed to a base 12 formed from a sheet of the same material as upper sheet 10. With such mats, it is envisaged that some form of transparent cover sheet 29 might be necessary to prevent accumulation of dust, sand, grit and other undesirable extraneous matter in the resultant grooves 30 between each channel 26 since the presence of such extraneous matter will reduce the efficiency of the system.

The flexibility of the collection mats makes them easy to transport and assemble.

The closed loop is completed by pipes 32, 34, 36 linking the outlet port 24 of the second mat 6 to the inlet port 22 of the first mat 4 via a hydrogen release unit 38, an optional oxygen release unit 40 and the pump 8 for circulating the solution around the closed loop. The pump is preferably positioned so that it creates a positive pressure in the mats rather than a negative pressure. With such an arrangement, if a mat develops a leak, the solution slowly leaks out until the leak is stopped rather than air being drawn into the system.

In a preferred method of operation of the present apparatus, the catalytic photo-oxidation of water is achieved by circulating an aqueous solution containing substances D, R and Ox through mats 2 and 4. D absorbs sunlight and the excited D reacts with R, Ox and water so that R is oxidised to $R_{Ox}$ and Ox is reduced to $Ox_R$. When the solution reaches unit 38, hydrogen is released from $Ox_R$ and Ox is regenerated. The released hydrogen is conveyed to a suitable collection point via conduit 42. Similarly, in some processes when the solution reaches unit 40, oxygen is released and R is regenerated. The liberated oxygen passes along conduit 44 for collection or release.

The solution is then recycled to collection mat 2 via pump 8, an appropriate quantity of water having been added to the closed loop via inlet 46 from a source 48 to make up for the water which has dissociated during the preceding circulation of the solution around the closed loop.

A catalytic process for the photo-oxidation of water preferred for use in the present method is that described in U.S. Ser. No. 895,555 filed Apr. 12, 1978.

This application describes and claims a process for the catalytic photo-oxidation of water by visible light which process comprises irradiating with light in the visible region of the spectrum a solution comprising:

(i) water, (ii) as photo catalyst, a starting manganese complex which is a manganese (II) or manganese (III) complex of formula MnL wherein L is a phthalocyanine ligand, a 5, 10, 15, 20-tetraphenylporphyrin (TPP) ligand or a 5, 10, 15, 20-tetrapyridyl porphyrin (TPyP) ligand, each of said ligands optionally being substituted by further substituents, the said starting manganese complex being capable of undergoing a transition into an excited state on irradiation with visible light with subsequent conversion to the corresponding manganese (IV) complex, and (iii) a compound which is an electron acceptor and which is a sufficiently powerful oxidising agent to abstract electrons from the excited manganese complex, the pH of the reaction mixture being chosen so that upon irradiation, the starting manganese complex will be oxidised to the corresponding manganese (IV) complex and the electron acceptor will be reduced to form a reduced electron acceptor and so that, subsequently, the manganese (IV) complex will be reduced back to the corresponding manganese (II) complex with concomitant conversion of water into oxygen.

Thus this preferred photochemical process is carried out under conditions such that Mn (II) and Mn (III) can be photo-oxidsed to Mn (IV) which is a powerful oxidant and which can react, photochemically or thermally, to liberate $O_2$ from water and itself return to the starting manganese complex. The overall reaction is the oxidation of water to oxygen and the simultaneous reduction of an electron acceptor to form a compound which acts as a store of energy and which may subsequently be used as, or converted to, a chemical fuel.

Both the manganese complex and the electron acceptor must either be water soluble compounds or must be capable of being solubilised into a micellar solution by the presence in the compound of suitable ligands such as long aliphatic chains which are hydrophobic or by the use of micelle-forming surfactants such as sodium lauryl sulphate or cetyltrimethyl ammonium bromide. In this way the required aqueous solutions of reactants can be formed. When the manganese complex is present in the form of micelles, then it is usual to use a water-soluble electron acceptor. Similarly if the electron acceptor is present in the form of micelles, the manganese complex used is usually one which is water-soluble.

The starting manganese complex used in this preferred photochemical process will absorb light in the visible region of the spectrum, that is to say will absorb energy from sunlight, and will undergo a photo-oxidation reaction to form the corresponding manganese (IV) complex, which at an appropriate pH will react, thermally or photochemically, with water to give oxygen.

The phthalocyanine and porphyrin ligands preferably contain at least two, and generally up to eight, water-solubilising groups. By a "water-solubilising group" is meant a group such as a carboxy group or sulpho group which increases the hydrophilic character of a compound to which it is attached. There are usually four water-solubilising groups present in each ligand, one on each of the four benzene rings of each ligand. Particularly preferred starting manganese complexes are a phthalocyanine complex of formula:

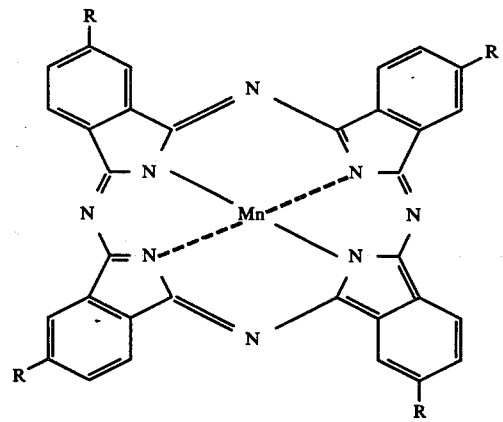

wherein R is a —$CO_2H$ or a —$SO_3H$ group; or a tetraphenylporphyrin complex of formula:

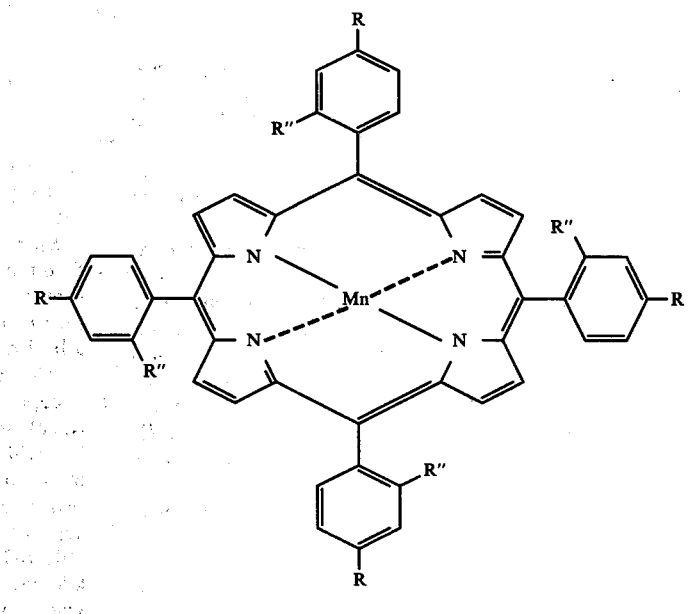

wherein R is also a —$CO_2H$ or —$SO_3H$ group, and R" is a $C_1$ to $C_4$ alkyl group. It has also been found that when the —$CO_2H$ groups mentioned above are replaced by groups such as —$CO_2R'$, or when the —$SO_3H$ groups mentioned above are replaced by —$SO_2NHR'$, wherein R' is a $C_{16}$ to $C_{22}$ alkyl group, especially a $C_{18}$ alkyl group, the resultant complex, although not water soluble, will form micelles in aqueous solution and enable the photochemical process to take place.

Examples of preferred tetrapyridylporphyrin complexes are the water soluble complex of formula:

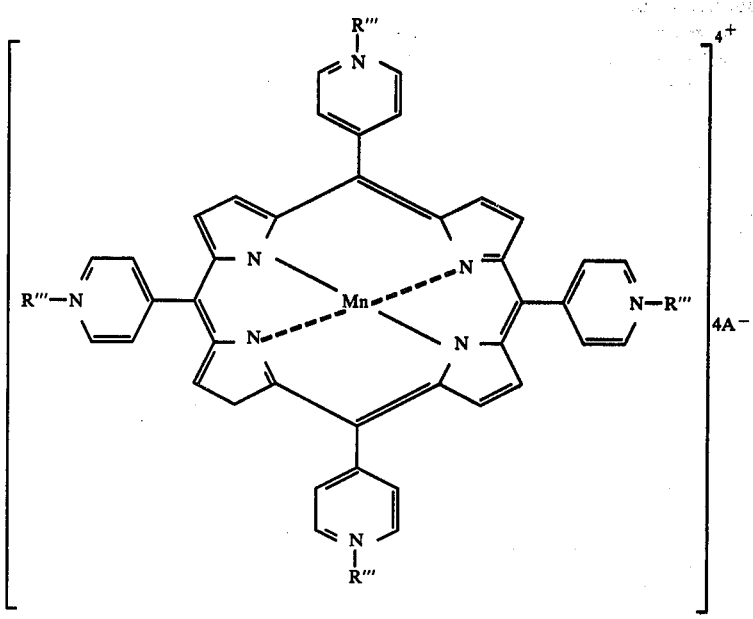

wherein each R''' group is a $C_{1-4}$ alkyl group, preferably a methyl group, and $A^-$ is a suitable anion such as iodide, and the corresponding free-bases which are also water soluble. The corresponding N, N', N'', N'''-tetra $C_{16}$ to $C_{22}$-alkyl derivatives are also suitable; these compounds are not water soluble, but form a dispersion of micelles in water.

Examples of suitable electron acceptors are quinones such as benzo-1,4-quinone and anthra-9,10-quinone, each optionally substituted with one or more atoms or groups chosen from alkyl, chloro, sulpho, phenylsulphonyl and cyano atoms or groups; a 1,4-naphthaquinone; certain heterocyclic compounds such as pyrazine and mono-, di-, tri- or tetramethylpyrazine, quinoxaline, phenazine, N-methylphenazine sulphate, NADH, methyl viologen and benzyl viologen, and dyes such as thionine and methylene blue.

Particularly preferred benzo-1,4-quinones are those of general formula (I)

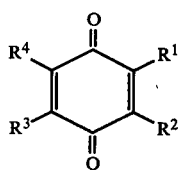

wherein each of $R^1$, $R^2$, $R^3$ and $R^4$ independently represents a hydrogen or a chlorine atom, or a methyl, sulpho, phenylsulphonyl or cyano group. In addition, when the quinone is to be incorporated in micelles, each of $R^1$, $R^2$, $R^3$ and $R^4$ may independently represent a higher alkyl group, particularly a $C_{16}$ to $C_{22}$ alkyl group.

Particularly preferred anthra-9,10-quinones are those of general formula (II):

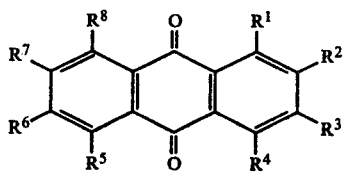

wherein each of $R^1$ to $R^8$ independently represent a hydrogen or chlorine atom or a methyl, sulpho, phenylsulphonyl, cyano or carboxy group.

More preferred are anthra-9,10-quinones of general formula (II), wherein each of $R^1$ and $R^2$ independently represents a hydrogen atom or a sulpho or carboxy group, and each of $R^5$ and $R^6$ independently represents a hydrogen atom, or a sulpho or carboxy group.

With an homogeneous aqueous solution, the electron acceptor is chosen to be soluble and stable in water at the pH used for the process. If the Mn complex is water-insoluble and is solubilised by use of a micelleforming material then, again, the electron acceptor must be water-soluble and stable at the pH used. Electron acceptors that are insoluble in water, such as 2,3,5,6-tetrachloro-1,4-benzoquinone, are solubilised in a micelleforming material and are used in conjunction with a water soluble Mn complex. In such cases, the maganese complex or the electron acceptor is formed into a micellar solution.

In most cases, the concentration of electron acceptor is controlled so that the molar ration of electron acceptor to Mn complex is of the order of 100:1. However, in general, the molar ratio of electron acceptor to manganese complex can be as low as 10:1. Moreover, any desired excess of electron acceptor can be used. These conditions give a large excess of electron acceptor and increase the yield of products.

In the preferred photochemical process both oxidation and reduction steps are dependent upon pH, because the pH affects the redox potentials of the manganese complexes. In general, oxidation requires higher pH conditions whilst reduction proceeds more readily in acidic solution. The pH of the reaction solution is chosen so that an efficient cyclic reaction system and optimum yields of photoproducts are obtained.

In general, the most suitable pH range is found to be 4 to 11, more preferably 7 to 9.

In an alternative arrangement the absorbing substance D, or the (D+R) combination, instead of being dissolved in the aqueous solution, is fixed to the surface of a solid carrier suspended in that solution. As a first example, manganese porphyrin is incorporated as a dye onto the surface of a thin polymer sheet. Strips 50 of this sheet (only one set of such strips being shown in FIG. 1), anchored at one end, are suspended in the flowing solution of the oxidising substance Ox. As a second example, the manganese porphyrin is fixed on an inorganic substance, such as a zeolite. This arrangement has the advantage that only the substance Ox and its reduced form are able to flow into the hydrogen generating unit 38 thus preventing interference by D or (D+R) with the catalytic or electrolytic operation of that unit.

Release of hydrogen in the hydrogen generating unit 38 can be achieved by generating hydrogen from the reduced electron acceptor by several methods, most of which are known. For example:

(i) Reaction of the reduced electron acceptor with an enzyme catalyst such as hydrogenase or a synthetic iron sulphur protein or an inorganic catalyst, e.g. a metal such as platinum. This method is suitable when the electron acceptor is for example methyl viologen $(MeV^{2+})$ or benzyl viologen, thionine or methylene blue. The reaction can be represented as:

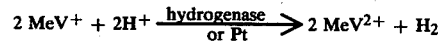

$$2\,MeV^+ + 2H^+ \xrightarrow{\text{hydrogenase or Pt}} 2\,MeV^{2+} + H_2$$

(ii) Electrolytic oxidation of the reduced electron acceptor. This method is suitable when the electron acceptor is for example a quinone or one of the heterocyclic compounds mentioned above. The oxidation can be represented as:

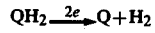

$$QH_2 \xrightarrow{2e} Q + H_2$$

It should be noted that although energy is expended in this process, the amount required is less than for direct electrolysis of water.

When the processes described in U.S. Ser. No. 895,555 filed Apr. 12, 1978 are used for the photo-oxidation reaction, oxygen is released through-out the flow system and unit 40 is therefore not required. However, when a unit 40 is used to release oxygen this can suitably be achieved by using an acid ion exchange resin in unit 40. It is known for example that oxidised manganese (IV) phthalocyanine sulphonate is stable in alkaline solution but liberates oxygen and returns to the manganese (II) form in acid. This effect can be used to liberate oxygen only at the specific point in the cycle where the acid catalyst is. This is an important advantage since it enables the photochemical part of the cycle to be performed under anaerobic conditions if so desired.

Thus it will be seen that important advantages of the present invention are that no chemical substances other than water are consumed, that it is a continuous cyclic flow system requiring no attention other than maintenance, and that it enables the oxidised and reduced products which are synthesised over a large surface area during the circulation around the closed loop to be separated from each other and be collected at a convenient location. Moreover the light collecting mat, which must of necessity be very large to collect solar energy over large areas, can be of low cost, for example 1 pound sterling per square meter.

What is claimed is:

1. A unidirectional continuous flow solar energy collector comprising a closed loop through which, in use, an aqueous solution can be circulated continuously in one direction only and be impinged upon by incident sunlight while circulating through the said loop; means for circulating the aqueous solution continuously in one direction through the closed loop; an inlet for introducing reactants into the closed loop; at least one station comprising a means for the liberation of hydrogen derived from the water of the aqueous solution, the hydrogen being in gaseous or combined form, said station being interposed in the closed loop in a manner such that the aqueous solution can flow through the station; and an outlet for withdrawing products from the closed loop.

2. Apparatus according to claim 1, wherein the closed loop is made of a flexible material.

3. Apparatus according to claim 2, wherein the material is flexible plastics sheeting.

4. Apparatus according to claim 1, wherein the closed loop includes a plurality of prefabricated collection mats, each having an inlet port and an outlet port by means of which the mats can be connected one to another in sequence.

5. Apparatus according to claim 4, wherein each mat is formed from an upper transparent sheet attached at its periphery in fluid tight manner to a base sheet.

6. Apparatus according to claim 5, wherein the upper sheet is also attached to the base sheet along spaced apart longitudinal lines disposed inwardly from the periphery of the sheets thereby to form a series of longitudinal channels which in use guide the flow of the solution through the mat.

7. Apparatus according to claim 5, wherein the surface of the base sheet which in use faces the incident sunlight is a reflective surface.

8. Apparatus according to claim 5, wherein the upper sheet and the base sheet of the mat are both of the same material.

9. Apparatus according to claim 5, wherein the base sheet of the mat is rubber reinforced bitumen.

10. Apparatus according to claim 4, which in addition includes a transparent cover sheet placed over each collection mat.

11. Apparatus according to claim 4, wherein the means for circulating the solution is positioned so that it creates a positive pressure in the mats.

12. Apparatus according to claim 1, further including within the closed loop a solid carrier to the surface of which is fixed one or more chemical reactants.

13. Apparatus according to claim 12, wherein the solid carrier is constituted by strips of flexible material impregnated with the chemical reactant and anchored at one end to the closed loop.

14. Apparatus according to claim 13, wherein the flexible strips are of plastics material.

15. Apparatus according to claim 12, wherein the solid carrier is constituted by an inert particulate material impregnated with the chemical reactant.

16. Apparatus according to claim 15, wherein the support is a zeolite.

17. Apparatus according to claim 1, wherein the means for circulating the solution is a pump.

18. Apparatus according to claim 17, wherein the pump is operated by solar energy.

19. Apparatus according to claim 18, wherein the pump is one whose operation is based on the fluidyne principle.

20. Apparatus according to claim 1, wherein said closed loop comprises a zone where said aqueous solution is impinged upon with said incident sunlight and a separate zone wherein hydrogen which is generated is liberated from the thus irradiated aqueous solution.

21. Apparatus according to claim 20, wherein said closed loop further comprises a zone wherein oxygen which is generated is liberated from the irradiated aqueous solution.

22. A method for the collection of solar energy by photo-oxidation of water and for the conversion of such energy into a chemical fuel, which method comprises: (i) forming an aqueous solution of an absorbing substance D, a reducing substance R and an oxidising substance Ox, the substances D R and Ox being chosen so that upon irradiation by sunlight dissociation and photo-oxidation of water takes place as a result of D absorbing light and the resultant excited state of D reacting with R, Ox and water to oxidise to R to $R_{Ox}$ and reduce Ox to $Ox_R$; (ii) causing the said aqueous solution to circulate in one direction around the closed loop of a unidirectional, continuous flow solar energy collection apparatus while irradiating the solution with incident sunlight to thereby cause said photo-oxidation of water; the said solar energy collection apparatus comprising a closed loop through which, in use, an aqueous solution is continuously circulated in one direction only and is impinged upon by incident sunlight while circulating the aqueous solution continuously in one direction around the closed loop, an inlet for introducing reactants into the closed loop, at least one first station comprising means for regenerating Ox from $Ox_R$ with liberation of hydrogen as chemical fuel, an optional at least one second station comprising means for regenerating R from $R_{Ox}$ with concomittant release of oxygen, the said first and second stations being interposed in the closed loop in a manner such that the said aqueous solution flows through the first and second stations, and an outlet for withdrawing products from the closed loop; (iii) at the said first station in the closed loop, regenerating Ox from $Ox_R$ with liberation of hydrogen as the chemical fuel; (iv) optionally at the said second station in the closed loop, regenerating R from $R_{Ox}$ with concomitant release of oxygen; and (v) introducing water into the closed loop to replace dissociated water.

23. A method according to claim 22, wherein the aqueous solution is circulated at a rate of 3 meters per minute.

24. A method according to claim 22, wherein the said liberation of hydrogen is performed using an enzyme catalyst, by an electrolytic oxidation process, or by a catalysed oxidation process.

25. A method according to claim 22, wherein the said release of oxygen is performed using a catalyst which is an acid ion-exchange resin.

26. The process according to claim 22, wherein said aqueous solution has a pH of 7 to 9.

* * * * *